No. 787,942. Patented April 25, 1905.

UNITED STATES PATENT OFFICE.

THEODORE S. PIERCE, OF WALLA WALLA, WASHINGTON.

COMPOUND FOR PAVING-BRICKS.

SPECIFICATION forming part of Letters Patent No. 787,942, dated April 25, 1905.

Application filed August 26, 1903. Serial No. 170,815.

*To all whom it may concern:*

Be it known that I, THEODORE S. PIERCE, a citizen of the United States, and a resident of Walla Walla, in the county of Walla Walla and State of Washington, have invented new and useful Improvements in a Compound for Paving-Bricks, of which the following is a full, clear, and exact description.

My invention relates to a certain novel and useful compound for the manufacture of building or paving bricks.

In carrying out my invention I have particularly in view as an object forming a compound from which bricks may be manufactured, such bricks when completed possessing the requisite and desired features of hardness, durability, and inexpensiveness.

To the accomplishment of the above-recited object my invention consists in the novel compound as hereinafter set forth.

When preparing my improved compound for bricks, I take four parts of slag and thoroughly mix therewith one part of cement. I then prepare a chemical solution composed of the following ingredients in substantially the proportions specified—that is to say, to forty gallons of water I add fifteen pounds of silicate of soda, two and one-half pounds of litharge, and one pound of sulfuric acid. The soda, litharge, and acid are added to the water, and the solution thus formed is supplied to the mixture of slag and cement in such quantities as to form a plastic mass of desired consistency. The bricks may then be formed from the compound either by hand-press, steam-power, or any well-known brick-making machine, such bricks being dried in the air after the molding process has been completed.

Having thus described my invention, I claim as new and desire to secure by Letters Patent—

The herein-described composition of matter, consisting of four parts of slag, one part of cement mixed together and then reduced to a plastic mass by the addition of a solution consisting of fifteen pounds of silicate of soda, two and one-half pounds litharge, one pound of sulfuric acid and forty gallons water in about the proportions specified.

In testimony whereof I have signed my name to this specification in the presence of two subscribing witnesses.

THEODORE S. PIERCE.

Witnesses:
LESTER S. WILSON,
FRANK HUNT.